Figure 1:
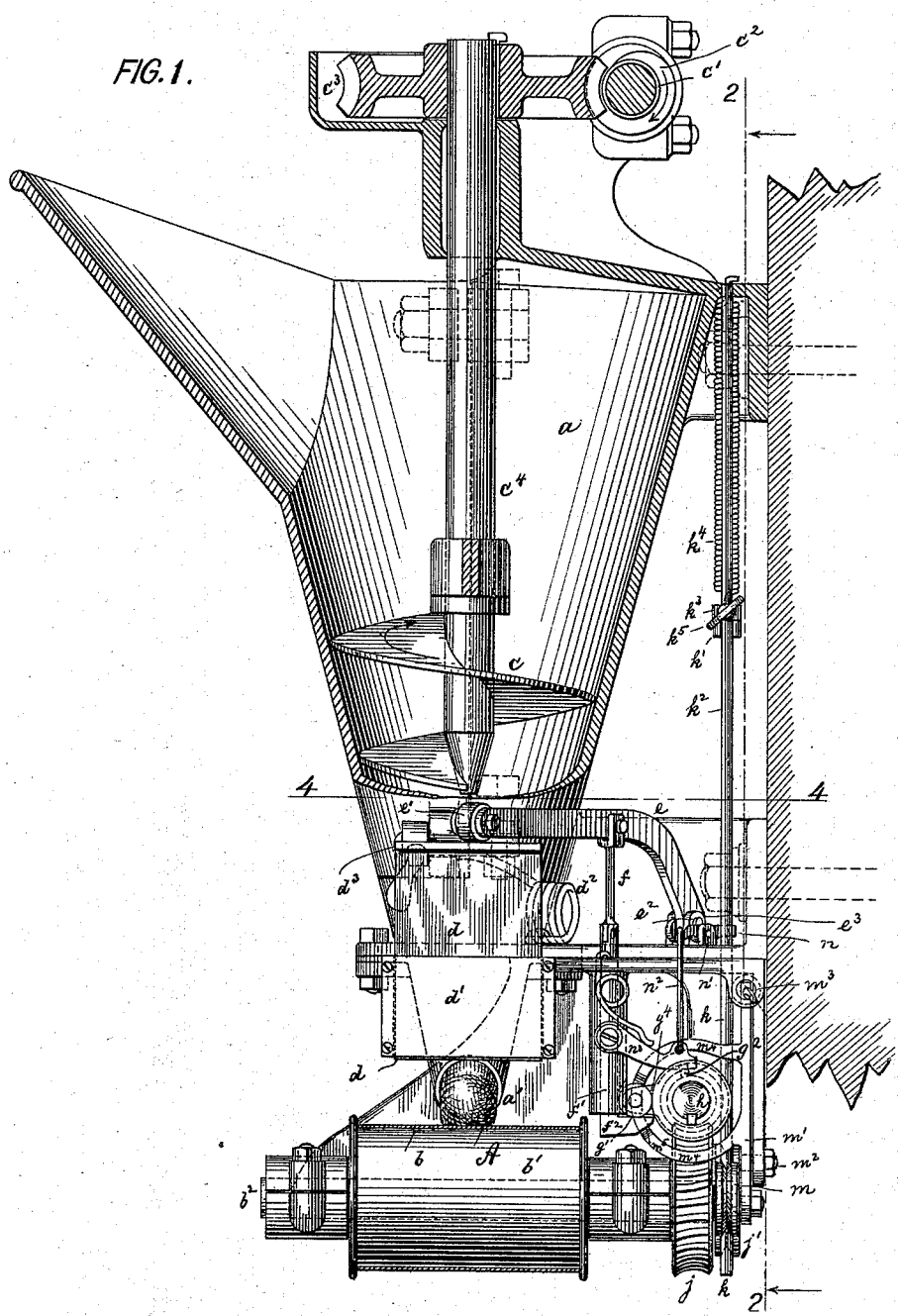

(No Model.)  3 Sheets—Sheet 1.

F. DÜHRKOP.
MACHINE FOR SHAPING AND CUTTING DOUGH.

No. 530,582.  Patented Dec. 11, 1894.

Witnesses:
John Becker
Theodor Becker.

Inventor:
Fritz Dührkop
by his attorneys
Roeder & Briesen

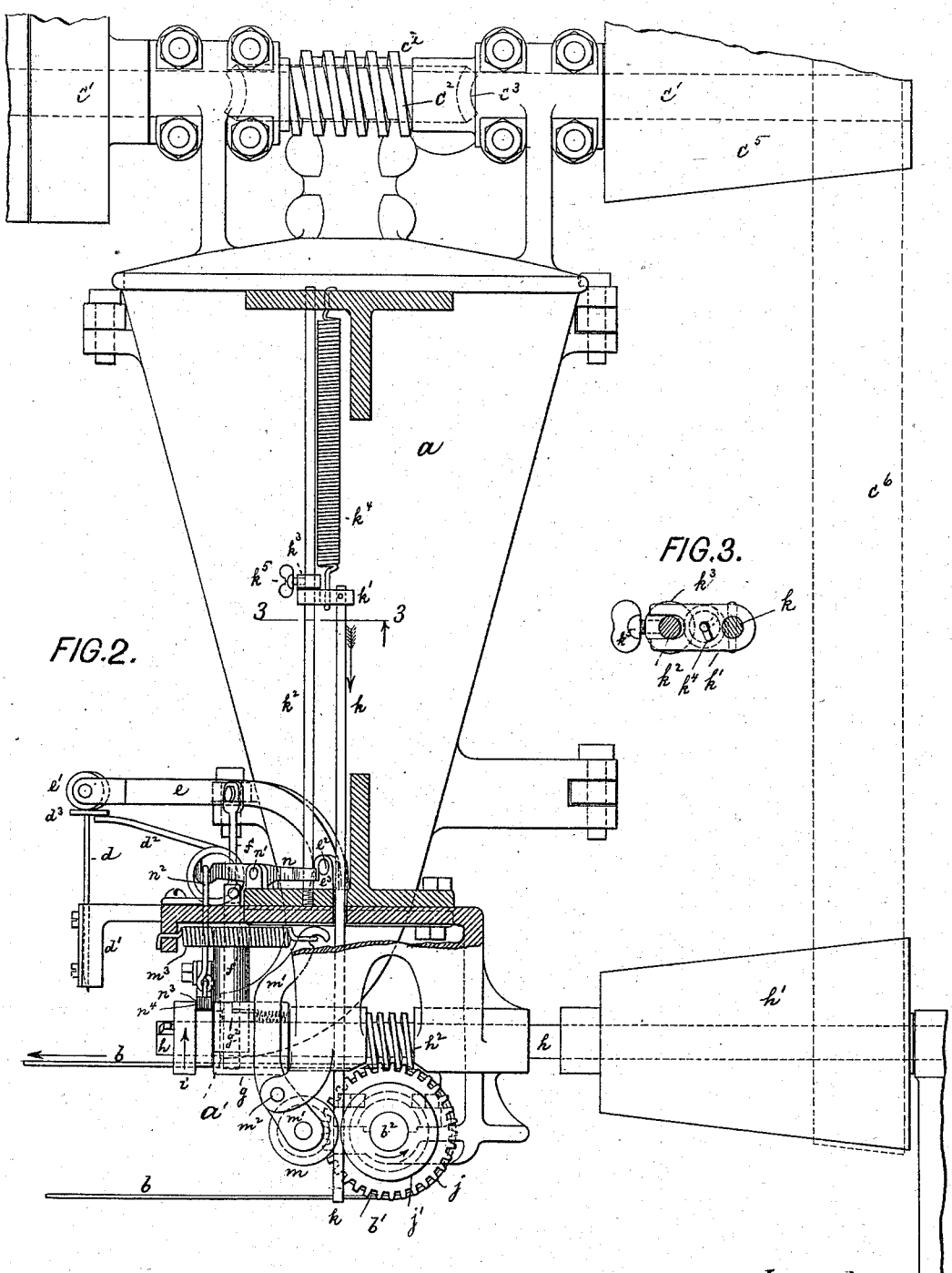

(No Model.) 3 Sheets—Sheet 3.
F. DÜHRKOP.
MACHINE FOR SHAPING AND CUTTING DOUGH.
No. 530,582. Patented Dec. 11, 1894.
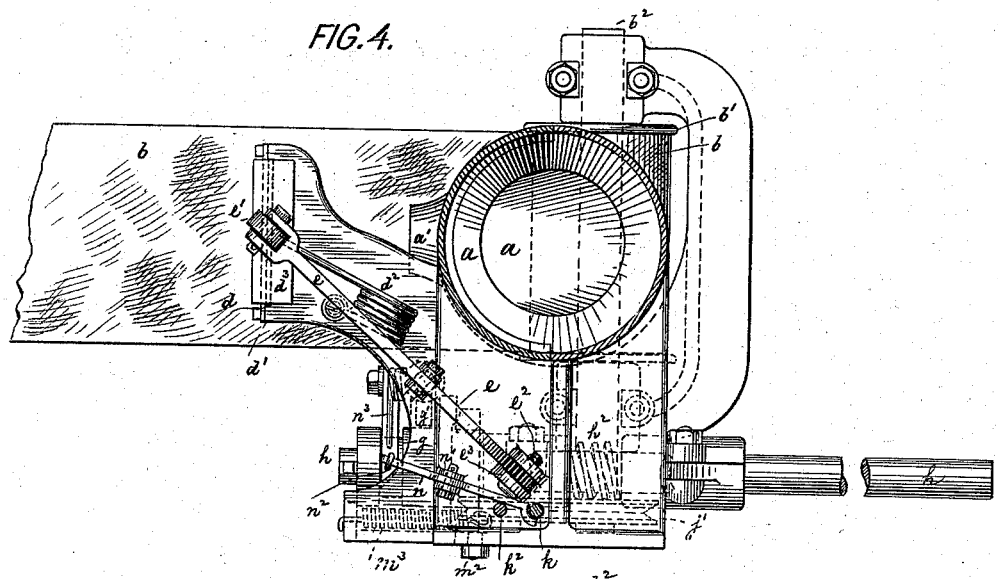
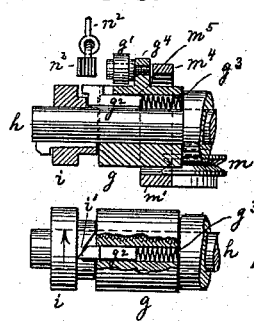
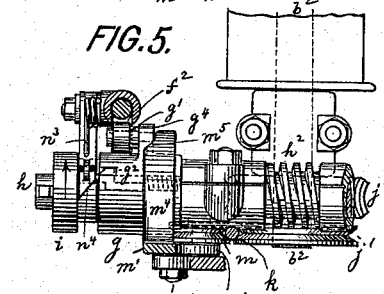
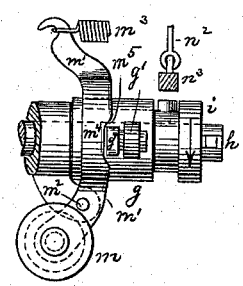
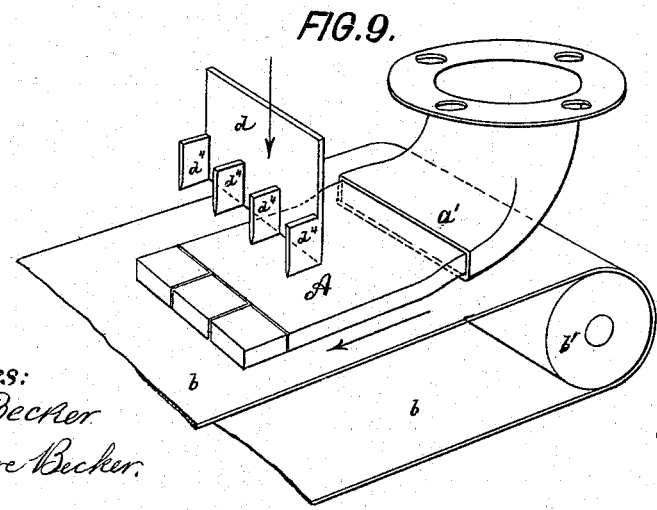
Witnesses:
John Becker.
Theodore Becker.
Inventor:
Fritz Dührkop
by his attorneys
Roeder & Briesen

UNITED STATES PATENT OFFICE.

FRITZ DÜHRKOP, OF NEW YORK, N. Y.

MACHINE FOR SHAPING AND CUTTING DOUGH.

SPECIFICATION forming part of Letters Patent No. 530,582, dated December 11, 1894.

Application filed May 24, 1894. Serial No. 512,263. (No model.)

*To all whom it may concern:*

Be it known that I, FRITZ DÜHRKOP, of New York city, New York, have invented an Improvement in Machines for Shaping and Cutting Dough, of which the following is a specification.

This invention relates to a machine for forming fermented dough into cylindrical bodies and cutting such bodies up into short lengths, sufficient to form a loaf or a roll. The cutting mechanism is so arranged that the blade alternately remains inactive above the dough for any given length of time, and then descends with great rapidity through the dough. Thus a sufficient quantity of dough is first shaped and fed forward to form the bread or roll, and then the cutting action is performed so quickly that the blade does not interfere with the continuously moving body of dough.

In the accompanying drawings: Figure 1 is a side elevation partly in section of the machine; Fig. 2, a vertical section on line 2, 2, Fig. 1; Fig. 3, a horizontal section on line 3, 3, Fig. 2; Fig. 4, a horizontal section on line 4, 4, Fig. 1; Fig. 5, a sectional top view of the knife-operating mechanism; Fig. 6, a horizontal section of part of the same; Fig. 7, an elevation, partly in section, of the collars $g$, $i$; Fig. 8, a side view of Fig. 5, and Fig. 9 a perspective view of a modification of the knife.

The letter $a$, represents a shell or vessel into which the dough is thrown and which is provided, at its lower end, with a discharge nozzle $a'$, that delivers the dough A upon an endless feed apron $b$. This apron passes over a pair of rollers, of which the roller $b'$, driven from the power shaft is shown. In order to feed the dough out of nozzle $a'$, there is hung within vessel $a$, a conveyer screw $c$, which receives motion from power shaft $c'$, by worm $c^2$, and worm wheel $c^3$, which is mounted upon the shaft $c^4$, of the conveyer screw.

The dough delivered upon the apron $b$, is cut into the lengths required for forming a loaf of bread or a roll, by a vertically reciprocating blade or cutter $d$, guided in slotted frame $d'$, and held in its elevated position by a spring $d^2$. The head $d^3$, of the cutter $d$, is engaged by a roller $e'$, of a one-armed lever $e$, pivoted by pin $e^2$, to a fixed support $e^3$. The lever $e$, is oscillated by a rod $f$, which moves within a tubular guide $f'$, and terminates at its lower end in a toe $f^2$. This toe is engaged by a roller $g'$, pivoted to a lug $g^4$, of a loose collar $g$, (Fig. 1,) surrounding a horizontal shaft $h$. This shaft is revolved by a cone pulley $h'$, that is connected to a cone pulley $c^5$, of power shaft $c'$, by belt $c^6$. Opposite to the loose collar $g$, the shaft $h$, carries a fixed collar $i$, having a beveled notch $i'$. (Fig. 7.) This notch is adapted to be engaged by a beveled spring bolt $g^2$, sliding in perforation $g^3$, of collar $g$. Normally the bolt $g^2$, engages the fixed collar $i$, and thus the loose collar $g$, is revolved by shaft $h$, to reciprocate the rod $f$, and consequently the cutter $d$.

In order to make the motion of cutter $d$, not uniform but intermittent, I withdraw the bolt $g^2$, from the fixed collar $i$, for a short time during each revolution of the shaft, and thus arrest the motion of the cutter between its descents. This is effected in the following manner: The shaft $h$, is provided with a worm $h^2$, engaging a worm wheel $j$, mounted upon the shaft $b^2$, of roller $b'$. Upon this shaft is also mounted the grooved roller $j'$, which is adapted to operate a sliding rod $k$, when the latter is held against it by friction clutch or roller $m$. The sliding rod $k$, is provided with a forked cross-piece $k'$, which straddles a fixed guide rod $k^2$. This guide rod is engaged by a vertically adjustable collar $k^3$, having clamp screw $k^5$, by which the position of the collar, and consequently the stroke of the slide may be regulated. A spring $k^4$, secured to cross-piece $k'$, and to shell $a$, serves to normally draw the slide upward. The rod $k$, is adapted to be held and clamped against the roller $j'$, by means of the roller $m$, pivoted to lever $m'$, which turns on pivot $m^2$. The upper end of the lever $m'$, is connected to a spring $m^3$, which tends to force the roller $m$ against slide $k$, and the latter against roller $j'$ (Fig. 2). In this way the revolution of roller $j'$, when engaging the rod $k$, will tend to draw the same down against the action of its spring $k^4$, while when the rod becomes disengaged, it will be drawn up by such spring. The lever $m'$, is oscillated at each revolution of shaft $h$, by the lug $g^4$, of loose collar $g$. This lug engages a bail $m^4$, of lever $m'$, (Fig. 8) which is provided with a seat or notch $m^5$. At each revolution of the shaft $h$, the lug $g^4$, will upon leaving its seat $m^5$, vibrate lever $m'$, by means of the bail $m^4$, to take the friction roller $m$, off the roller $j'$, and release the slide $k$, $k'$, which will now be drawn up by its spring. When upon the further revolution of the shaft $h$, the lug $g^4$, reenters its seat $m^5$, the spring $m^3$, will vibrate lever $m'$, to clutch the slide $k$ $k'$, between rollers $m$ $j'$, and in this way the slide is again lowered. The cross piece $k'$, of the slide, when arriving at its lowermost position, strikes against one arm of a lever $n$, turning on pivot $n'$. The other end of this lever operates by a rod $n^2$, a pivoted spring finger $n^3$, (Fig. 1,) having a beveled edge $n^4$, adapted to engage the spring bolt $g^2$. This lever, when lowered by means of rod $n^2$, is interposed within the path of the spring bolt, and will push the same away from the fixed collar $i$, and back into the movable collar $g$. Thus the movable collar is disconnected from the fixed collar and its motion is arrested until the withdrawal of the finger, by vibration of lever $n$, when the bolt is free to shoot forward and into re-engagment with the fixed collar. In this way the stroke of slide $k$ $k'$, by the movement of lever $n$, and finger $n^3$, determines the pause between the strokes of the cutter $d$.

It will be seen that by the above described mechanism, an intermittent feed is imparted to the cutter, so that it remains at rest above the feed apron, for a sufficient time to permit the dough to be fed forward upon the apron. When the proper length of dough has been thus fed forward, the cutter descends with great rapidity, so as not to interfere with the continuous forward motion of the dough. By setting the collar $k^3$, the stroke of the slide $k$, $k'$, and consequently the motion of lever $n$, may be adjusted, to adjust the play of finger $n^3$, and to thus shorten or lengthen the intervals between the descents of the cutter. In this way long and short sections of dough may be severed from the main body, to form bread and rolls of various sizes.

In Fig. 9, the discharge nozzle $a'$, of shell $a$, is made flat, and the cutter $d$, is provided with a series of parallel longitudinal blades $d^4$. In this way, a wide and flat strip of dough may be cut up simultaneously into transverse and into two or more longitudinal sections, to form a number of rolls by a single cut.

What I claim is—

1. The combination of a vessel having a discharge opening with a conveyer, a feed apron, a reciprocating cutter above the apron, and adjustable mechanism independent of the cutter-operating mechanism, for varying the intervals between the strokes of the cutter, substantially as described.

2. The combination of a vessel having a discharge opening with a conveyer, a feed apron, a uniformly reciprocating cutter above the apron, and a single adjustment stop movably supported upon the machine and provided with means for securing it in any one of the positions of its movement, which alone by its position determines the length of the intervals between the strokes of the cutter, substantially as described.

3. The combination of a vessel with a conveyer, a feed apron, a low speed shaft for operating the latter, a high speed shaft driving the apron shaft, a cutter reciprocating to and from the apron having intermittently an operative connection with the high speed shaft to reciprocate it in one direction, to obtain a quick stroke of the cutter, and means for reciprocating it in the opposite direction, the cutter being stationary for a period between the complete reciprocations, substantially as described.

4. The combination of a vessel, with a conveyer, a feed apron, a low speed shaft for operating the latter, a high speed shaft driving the apron shaft, a cutter reciprocating to and from the apron, having intermittently an operative connection with the high speed shaft to reciprocate it in one direction, to obtain a quick stroke of the cutter, and means for reciprocating it in the opposite direction as shown, the cutter being stationary for a period between the complete reciprocations, and means for regulating the length of the stationary period, substantially as described.

5. The combination of a vessel, with a conveyer, a feed apron, a cutter reciprocating upon and away from the feed apron having an intermittent operative connection with the driving mechanism of the machine for producing such reciprocation, and means independent of the operative mechanism for varying the stationary period between such reciprocations, substantially as described.

6. The combination of a cutter with an operating lever, a rod $f$, a shaft $h$, a fast and loose collar upon the same, a spring bolt adapted to connect the collars, and a roller $g'$, adapted to engage rod $f$, substantially as specified.

7. The combination of a cutter with an operating lever, a shaft $h$, a fast and loose collar upon the same, a spring bolt adapted to connect the collars, a finger adapted to engage the bolt, a lever that carries the finger, and an adjustable slide engaging said lever, substantially as specified.

8. The combination of rollers $j'$, $m$, with a slide engaged by the same, an adjustable collar $k^3$, a lever $n$, finger $n^3$, collars $i$, $g$, spring bolt $g^2$, rod $f$, lever $e$, and cutter $d$, substantially as specified.

9. The combination of slide $k$ $k'$, with roller $j'$, lever $m'$, roller $m$, pivoted thereto, a yoke $m^4$, secured to the lever, and with a collar $g$, having lug $g^4$, adapted to engage the yoke, substantially as specified.

FRITZ DÜHRKOP.

Witnesses:
F. V. BRIESEN,
WILLIAM SCHULZ.